(12) United States Patent
Mizusaki et al.

(10) Patent No.: US 9,036,119 B2
(45) Date of Patent: May 19, 2015

(54) LIQUID CRYSTAL COMPOSITION, LIQUID CRYSTAL DISPLAY DEVICE, AND METHOD FOR PRODUCING LIQUID CRYSTAL DISPLAY DEVICE

(75) Inventors: Masanobu Mizusaki, Osaka (JP); Yuichiro Yamada, Osaka (JP); Satoshi Enomoto, Inzai (JP); Yuki Hara, Kawaguchi (JP); Hideo Kikuchi, Tokyo (JP)

(73) Assignees: SHARP KABUSHIKI KAISHA, Osaka (JP); TOYO GOSEI CO., LTD., Chiba (JP)

( * ) Notice: Subject to any disclaimer, the term of this patent is extended or adjusted under 35 U.S.C. 154(b) by 8 days.

(21) Appl. No.: 14/003,759

(22) PCT Filed: Mar. 8, 2012

(86) PCT No.: PCT/JP2012/055927
§ 371 (c)(1),
(2), (4) Date: Nov. 18, 2013

(87) PCT Pub. No.: WO2012/121319
PCT Pub. Date: Sep. 13, 2012

(65) Prior Publication Data
US 2014/0168586 A1    Jun. 19, 2014

(30) Foreign Application Priority Data

Mar. 9, 2011    (JP) ................. 2011-051839

(51) Int. Cl.
*C09K 19/52* (2006.01)
*C09K 19/54* (2006.01)
(Continued)

(52) U.S. Cl.
CPC ........ *G02F 1/1337* (2013.01); *G02F 1/133711* (2013.01); *G02F 1/133707* (2013.01); *G02F 2001/133715* (2013.01); *G02F 1/1343* (2013.01)

(58) Field of Classification Search
CPC ................. C09K 19/548; C09K 19/56; C09K 2019/0448; G02F 1/1337; G02F 1/133711; G02F 1/13788; G02F 2001/133715
USPC ..................... 252/299.01, 299.5; 349/86, 123
See application file for complete search history.

(56) References Cited

U.S. PATENT DOCUMENTS

2005/0116200 A1    6/2005    Nakanishi et al.
2005/0119433 A1    6/2005    Sakayori
(Continued)

FOREIGN PATENT DOCUMENTS

JP    03-149267    6/1991
JP    09-255706    9/1997
(Continued)

OTHER PUBLICATIONS

International Search Report for corresponding PCT Application No. PCT/JP2012/055927, mailed Jun. 19, 2012 (with English language translation).

*Primary Examiner* — Shean C Wu
(74) *Attorney, Agent, or Firm* — Greer Burns & Crain, Ltd.

(57) ABSTRACT

Several aspects of the present invention provide a liquid crystal composition capable of shortening the takt time and achieving excellent display qualities, and a liquid crystal display device and a method for producing a liquid crystal display device which use the liquid crystal composition. The liquid crystal composition of several aspects of the present invention includes a liquid crystal material and one or more kinds of radical polymerizable monomers, at least one kind of the radical polymerizable monomers being a compound generating radicals through a self-cleavage reaction by exposure to light and having at least two radical polymerizable groups.

20 Claims, 1 Drawing Sheet

(51) Int. Cl.
*G02F 1/1337* (2006.01)
*G02F 1/1343* (2006.01)

(56) References Cited

U.S. PATENT DOCUMENTS

| | | | |
|---|---|---|---|
| 2005/0264737 A1 | 12/2005 | Kataoka et al. | |
| 2006/0038936 A1 | 2/2006 | Hirosawa | |
| 2007/0037096 A1 | 2/2007 | Sakayori | |
| 2008/0090026 A1 | 4/2008 | Bernatz et al. | |
| 2010/0272925 A1 | 10/2010 | Goetz et al. | |
| 2013/0169916 A1* | 7/2013 | Mizusaki et al. | 349/123 |
| 2013/0324633 A1* | 12/2013 | Enomoto et al. | 522/34 |
| 2013/0342791 A1* | 12/2013 | Mizusaki et al. | 349/86 |
| 2014/0139794 A1* | 5/2014 | Ohnishi et al. | 349/123 |
| 2014/0333879 A1* | 11/2014 | Noma et al. | 349/124 |

FOREIGN PATENT DOCUMENTS

| | | |
|---|---|---|
| JP | 11-223944 | 8/1999 |
| JP | 2001-052613 | 2/2001 |
| JP | 2004-224993 | 8/2004 |
| JP | 2005-126687 | 5/2005 |
| JP | 2005-221617 | 8/2005 |
| JP | 2005-239746 | 9/2005 |
| JP | 2005-314634 | 11/2005 |
| JP | 2005-338613 | 12/2005 |
| JP | 2006-058755 | 3/2006 |
| JP | 2008-116931 | 5/2008 |
| JP | 4175826 | 8/2008 |
| WO | 2012/032857 | 3/2012 |

* cited by examiner

LIQUID CRYSTAL COMPOSITION, LIQUID CRYSTAL DISPLAY DEVICE, AND METHOD FOR PRODUCING LIQUID CRYSTAL DISPLAY DEVICE

This application is the U.S. national phase, filed under 35 U.S.C. §371, of International Application No. PCT/JP2012/055927, filed Mar. 8, 2012, which claims priority to Japanese Patent Application No. 2011-051839, filed Mar. 9, 2011, the entire contents of which are incorporated by reference herein.

TECHNICAL FIELD

Several aspects of the present invention relate to a liquid crystal composition, a liquid crystal display device, and a method for producing a liquid crystal display device. More specifically, several aspects of the present invention relate to a liquid crystal composition for forming a polymer layer capable of controlling the alignment of liquid crystals; a liquid crystal display device with the polymer layer obtained by polymerizing monomers in the liquid crystal composition; and a production method suitable for production of the liquid crystal display device.

BACKGROUND ART

A liquid crystal display (LCD) is a display device that controls transmission/blocking of light (ON/OFF of display) by controlling the alignment of liquid crystal molecules having birefringence. LCDs employ display modes such as a twisted nematic (TN) mode in which liquid crystal molecules having positive dielectric anisotropy are twist-aligned in the thickness direction of the liquid crystal layer; a vertical alignment (VA) mode in which liquid crystal molecules having negative dielectric anisotropy are aligned vertically to the substrate surfaces; and an in-plane switching (IPS) mode in which liquid crystal molecules having positive dielectric anisotropy are aligned horizontally to the substrate surfaces, and a lateral electric field is applied to the liquid crystal layer.

Since LCDs are thin, light, and consume little power; they are widely used as a display for televisions, personal computers, and PDAs, for example. Particularly in recent years, upsizing of liquid crystal display devices has been rapidly progressing, as represented by liquid crystal display devices for televisions, for example. A suitable mode for an upsized liquid crystal display device is a multi-domain vertical alignment (MVA) mode which provides a wide viewing angle and allows production of a display device in high yield even if the device has a large area. The multi-domain vertical alignment mode vertically aligns liquid crystals having negative dielectric anisotropy, and employs banks (linear protrusions) or notches (slits) in electrodes as structures for alignment control on a substrate. In the MVA mode, such structures for alignment control enable control of the alignment direction of liquid crystals in multiple directions under application of a voltage even if alignment films have not undergone a rubbing treatment. Thus, the MVA mode has a wider viewing angle than the conventional TN mode.

However, the MVA mode has a problem that the display is dark. The main cause is that areas with linear protrusions (ribs) or slits form the boundaries of alignment divisions to generate dark lines which reduce the transmittance during white display, resulting in a dark display. This problem is solved when the distances between the ribs are sufficiently large, but in this case, the number of the ribs which are alignment-controlling structures is reduced. As a result, a longer time is required for alignment stabilization of the liquid crystals upon application of a predetermined voltage, which decreases the response speed. Patent Literatures 1 to 5, for example, teach a technology for providing pretilt angles by use of polymers (hereinafter, the polymers are also referred to as polymer sustained alignment (PSA) layers) which solves the above problems and achieves high luminance and high-speed response.

In the PSA technology, a liquid crystal composition obtained by mixing liquid crystals with polymerizable components such as monomers and oligomers is placed between substrates. Then, the components such as monomers are polymerized into a polymer while a voltage is applied between the substrates to tilt the liquid crystal molecules. Thereby, the liquid crystals are tilted at a predetermined pretilt angle even after elimination of the voltage, so that the liquid crystal alignment direction can be established. Here, the components such as monomers are polymerized by irradiation with heat or light (ultraviolet light). The PSA technology eliminates the need for ribs and thus improves the aperture ratio, and also imparts a pretilt angle smaller than 90° over the entire display region, enabling high-speed response.

For the alignment control of liquid crystals, there is a known method of forming a polymer wall between a pair of substrates of a liquid crystal display device (for example, Patent Literature 6). The polymer wall in the method is a structure formed to surround a liquid crystal layer, and is substantially different from a PSA layer which is a thin layer formed on an alignment film.

CITATION LIST

Patent Literature

Patent Literature 1: JP 4175826 B
Patent Literature 2: JP 2005-221617 A
Patent Literature 3: JP 2005-338613 A
Patent Literature 4: JP 2008-116931 A
Patent Literature 5: JP 2006-58755 A
Patent Literature 6: JP H9-255706 A

SUMMARY OF INVENTION

Technical Problem

According to the investigations by the inventors of the present invention, a pretilt angle-imparting technology using a PSA layer has some problems relating to display unevenness that occurs when images are displayed on a produced LCD. One of the problems is display unevenness in the image display on a produced LCD due to liquid crystal alignment defects that occur locally when the tilt angle of liquid crystal molecules is changed by voltage application during polymerization of monomers. The degree of the display unevenness differs depending on the monomers to be used. Monomers that are soluble in liquid crystal materials are not always suitable for formation of PSA layers. Moreover, it is reported that, even without addition of a photopolymerization initiator, typically IRGACURE 651 (produced by BASF), a PSA layer having vertical alignment property can be formed by injecting a composition containing monomers for PSA layer formation into a cell, exposing the cell to light while applying a voltage, and polymerizing the monomers by a long-time ultraviolet light irradiation. In this case, display unevenness is reduced compared to the case where a polymerization initiator is used. Thus, products with better display qualities tend to be obtained. However, a decline in the productivity due to an increase in the takt time is a problem in this case.

To shorten the polymerization time, a method of increasing the UV irradiation amount or a method of performing irradiation with light having a wavelength of 350 nm or less can be used. These methods can shorten the takt time, but are reported to deteriorate the structures inside the panel to decrease the display performance as described in, for example, Patent Literatures 2 and 5. It is difficult to achieve both shortening of takt time and excellent display qualities by simply adjusting the irradiation conditions.

Also in the case of adding a polymerization initiator to shorten the polymerization time, it is reported that although the takt time can be shortened, problems such as display unevenness occur, i.e., the display performance is deteriorated. That is, it is difficult to achieve both shortening of takt time and excellent display qualities by simply adding a polymerization initiator. Therefore, a method of forming a PSA layer by photopolymerization without a conventional photopolymerization initiator has been drawing attention in making a development to achieve both high display qualities and shortening of takt time. Still, even with this method, there are problems that the polymerization initiator scheme is not clear and the takt time needs to be shortened.

Several aspects of the present invention have been made in view of the above current state of the art, and aims to provide a liquid crystal composition capable of shortening the takt time and achieving excellent display qualities.

Solution to Problem

The present inventors have made various studies on the causes of image sticking to the liquid crystal display. As a result, they have made the following finding. That is, in the case of a polymerization initiator causing self-cleavage when exposed to light as in the reported case of IRGACURE 651, the self-cleavage causes easily chargeable impurities to remain in the liquid crystal layer. The residual impurities produce DC offset voltage inside the cell to lead to different alignment states of liquid crystals under voltage, thereby causing image sticking.

More specifically, they have found that the following new method makes it possible to shorten the takt time while maintaining excellent display qualities. That is, a self-cleaving photopolymerization initiator to which a polymerizable group is bonded is used as a radical polymerizable monomer. Here, the radical polymerizable monomer is added as a PSA layer formation material to the liquid crystal material. Also, the radical polymerizable monomer undergoes self-cleavage when exposed to light and thus efficiently generates radicals to promote polymerization. Further, components generated by the cleavage during the reaction have a polymerizable group. In this method, the initiator itself is polymerized to form a PSA layer. Thereby, the initiator components can be effectively phase-separated from the liquid crystal layer. This method can greatly shorten the takt time compared to methods without a polymerization initiator, and also can provide a liquid crystal display panel with favorable display qualities. Consequently, the present inventors have solved the above problems, completing several aspects of the present invention.

That is, one aspect of the present invention is a liquid crystal composition including a liquid crystal material and one or more kinds of radical polymerizable monomers, at least one kind of the radical polymerizable monomers being a compound generating radicals through a self-cleavage reaction by exposure to light and having at least two radical polymerizable groups.

The liquid crystal composition of several aspects of the present invention is not especially limited by other components as long as it essentially includes the above-mentioned components.

When the polymer layer is formed in the liquid crystal display device by using as a radical polymerizable monomer a compound generating radicals through a self-cleavage reaction by exposure to light and having at least two radical polymerizable groups, the polymerization reaction can proceed in a short time without another polymerization initiator. In addition, impurities from the polymerization initiator are not generated, whereby reduction in the voltage holding ratio (VHR) in the liquid crystal layer is prevented, and deterioration of the display qualities can be reduced. Also, since only a short-time exposure to light is required, deterioration of the constitutional components due to a long-time exposure to light can be prevented, and a liquid crystal display device with high reliability can be produced.

Examples of the radical polymerizable group include a (meth)acryloyloxy group, a (meth)acryloylamino group, a vinyl group, and a vinyloxy group. The (meth)acryloyloxy group herein refers to an acryloyloxy group or a methacryloyloxy group, and the (meth)acryloylamino group refers to an acryloylamino group or a methacryloylamino group.

The compound generating radicals through a self-cleavage reaction by exposure to light preferably generates radicals when exposed to light having a wavelength of 350 nm or more. The compound generating radicals through a self-cleavage reaction by exposure to light preferably generates radicals when exposed to light having a wavelength of less than 400 nm. Since irradiation with light having a wavelength of less than 350 nm can deteriorate the structures in the panel to deteriorate the performance of the display, the self-cleaving photopolymerization initiator having a polymerizable group bonded thereto preferably causes a self-cleavage reaction efficiently when exposed to light having a wavelength of 350 nm or more, thereby generating radicals. Also, in the case that the photopolymerization initiator absorbs light at 400 nm or more from the backlight (cold cathode fluorescence tube or LED) for display in common usage, if the photopolymerization initiator having gone through phase separation due to polymerization without being cleaved is reacted while the display is driven, the long-term reliability is considered to decrease. To produce a liquid crystal display device with high long-term reliability, a polymerizable group is bonded to a photopolymerizable compound having no or sufficiently low absorption at 400 nm or more.

Examples of the radical polymerizable monomer include monomers having a polymerizable group bonded to a self-cleaving photopolymerization initiator generating radicals through a self-cleavage reaction by exposure to light. Specific examples thereof include monomers obtained by directly bonding a polymerizable group to or bonding a functional group having a polymerizable group to the molecular framework of the following self-cleaving photopolymerization initiators: 2,2-dimethoxy-1,2-diphenylethan-1-one (product name: IRGACURE 651, product of BASF, the same applies to the following), 1-hydroxy-cyclohexyl-phenyl-ketone (product name: IRGACURE 184), 2-hydroxy-2-methyl-1-phenyl-propan-1-one (product name: IRGACURE 1173), 1-[4-(2-hydroxyethoxy)-phenyl]-2-hydroxy-2-methyl-1-propan-1-one (product name: IRGACURE 2959), 2-hydroxy-1-{4-[4-(2-hydroxy-2-methyl-propionyl)-benzyl]-phenyl}-2-methyl-propan-1-one (product name: IRGACURE 127), phenylglyoxylic acid methyl ester (product name: DAROCURMBF), 2-methyl-1-[4-(methylthio)phenyl]-2-morpholinopropan-1-one (product name: IRGA- CURE 907), 2-benzyl-2-dimethylamino-1-(4-morpholinophenyl)-butanone-1 (product name: IRGACURE 369), 2-dimethylamino-2-(4-methyl-benzyl)-1-(4-morpholin-4-yl-phenyl)-butan-1-one (product name: IRGACURE 379), bis(2,4,6-trimethylbenzoyl)-phenylphosphine oxide (product name: ORGACURE 819), 2,4,6-trimethylbenzoyl-diphenyl-phosphine oxide (product name: DAROCURTPO), bis($\eta^5$-2,4-cyclopentadien-1-yl)-bis(2,6-difluoro-3-(1H-pyrrol-1-yl)-phenyl)titanium (product name: IRGACURE 784), 1,2-octanedione,1-[4-(phenylthio)-,2-(O-benzoyloxime)] (product name: IRGACUREOXE 01), ethanone,1-[9-ethyl-6-(2-methylbenzoyl)-9H-carbazol-3-yl]-,1-(O-acetyloxime) (product name: IRGACUREOXE 02), and 2-ethylhexyl-4-dimethylaminobenzoate (product name: DAROCUREHA).

The compound generating radicals through a self-cleavage reaction by exposure to light and having at least two radical polymerizable groups is preferably a self-cleaving photopolymerization initiator having an absorption coefficient of 20 ml/g·cm or less for light having a wavelength of 400 nm or more, in view of the driving conditions of the liquid crystal display device. Specific examples thereof include monomers obtained by directly bonding a polymerizable group to or bonding a functional group having a polymerizable group to the molecular framework of the following self-cleaving photopolymerization initiators: 2,2-dimethoxy-1,2-diphenylethan-1-one (product name: IRGACURE 651, product of BASF, the same applies to the following), 1-hydroxy-cyclohexyl-phenyl-ketone (product name: IRGACURE 184), 2-hydroxy-2-methyl-1-phenyl-propan-1-one (product name: IRGACURE 1173), 1-[4-(2-hydroxyethoxy)-phenyl]-2-hydroxy-2-methyl-1-propan-1-one (product name: IRGACURE 2959), 2-hydroxy-1-{4-[4-(2-hydroxy-2-methyl-propionyl)-benzyl]-phenyl}-2-methyl-propan-1-one (product name: IRGACURE 127), phenylglyoxylic acid methyl ester (product name: DAROCURMBF), 2-methyl-1-[4-(methylthio)phenyl]-2-morpholinopropan-1-one (product name: IRGACURE 907), ethanone,1-[9-ethyl-6-(2-methylbenzoyl)-9H-carbazol-3-yl]-1-(O-acetyloxime) (product name: IRGACUREOXE 02), and 2-ethylhexyl-4-dimethylaminobenzoate (product name: DAROCUREHA).

The compound generating radicals through a self-cleavage reaction by exposure to light and having at least two radical polymerizable groups is more preferably a compound represented by the following formula (1):

[Chem. 1]

(1)

wherein $R^1$ represents a $C_{1-4}$ linear or branched alkyl or alkenyl group, or $Sp^3$-$P^3$;

$R^2$ represents a $C_{1-4}$ linear or branched alkyl or alkenyl group, or $Sp^4$-$P^4$;

$P^1$, $P^2$, $P^3$, and $P^4$ represent the same or different radical polymerizable groups, and the total number of the groups is 2 or more;

$Sp^1$ represents a $C_{1-6}$ linear, branched, or cyclic alkylene, alkyleneoxy, or alkylene carbonyloxy group, or a direct bond, and when $m^1$ is 2 or more, $Sp^1$s are the same as or different from one another;

$Sp^2$ represents a $C_{1-6}$ linear, branched, or cyclic alkylene, alkyleneoxy, or alkylene carbonyloxy group, or a direct bond, and when $m^2$ is 2 or more, $Sp^2$s are the same as or different from one another;

$Sp^3$ represents a $C_{1-6}$ linear, branched, or cyclic alkylene, alkyleneoxy, or alkylene carbonyloxy group;

$Sp^4$ represents a $C_{1-6}$ linear, branched, or cyclic alkylene, alkyleneoxy, or alkylene carbonyloxy group;

$L^1$ represents a —F group, a —OH group, or a $C_{1-12}$ linear or branched alkyl, alkenyl, or aralkyl group, and when $n^1$ is 2 or more, $L^1$s are the same as or different from one another;

if two $L^1$s are bonded to respective two adjacent carbon atoms on the aromatic ring, the two $L^1$s may be bonded to each other to form a ring structure, and are the same as or different from one another, each representing a $C_{1-12}$ linear or branched alkylene or alkenylene group;

$L^2$ represents a —F group, a —OH group, or a $C_{1-12}$ linear or branched alkyl, alkenyl, or aralkyl group, and when $n^2$ is 2 or more, $L^2$s are the same as or different from one another;

if two $L^2$s are bonded to respective two adjacent carbon atoms on the aromatic ring, the two $L^2$s may be bonded to each other to form a ring structure, and are the same as or different from one another, each representing a $C_{1-12}$ linear or branched alkylene or alkenylene group;

one or more hydrogen atoms on the alkyl, alkenyl, alkylene, alkenylene, or aralkyl group for $L^1$ or $L^2$ may be replaced by —F groups or —OH groups;

a —CH$_2$— group on the alkyl, alkenyl, alkylene, alkenylene, or aralkyl group for $L^1$ or $L^2$ may be replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, a Sp$^1$-P$^1$ group, or a Sp$^2$-P$^2$ group as long as an oxygen atom, a sulfur atom, and a nitrogen atom are mutually apart;

$m^1$ is an integer of 1 to 3;
$m^2$ is an integer of 0 to 3;
$n^1$ is an integer of 0 to 4;
$n^2$ is an integer of 0 to 4;
$m^1$ and $n^1$ add up to an integer of 1 to 5;
$m^2$ and $n^2$ add up to an integer of 0 to 5; and
$m^1$ and $m^2$ add up to an integer of 1 to 6.

The above $P^1$, $P^2$, $P^3$, and $P^4$ are preferably the same or different (meth)acryloyloxy groups.

The above $R^1$ and the above $R^2$ are preferably the same. The above $P^1$ and the above $P^2$ are preferably the same.

Specific examples of the compound represented by the following formula (1) include compounds represented by the following formula (2):

[Chem. 2]

(2)

wherein $R^3$ represents a $C_{1-4}$ linear or branched alkyl or alkenyl group;

$R^4$ represents a $C_{1-4}$ linear or branched alkyl or alkenyl group;

$P^1$ and $P^2$ represent the same or different radical polymerizable groups;

$Sp^1$ represents a $C_{1-6}$ linear, branched, or cyclic alkylene, alkyleneoxy, or alkylene carbonyloxy group, or a direct bond; and $Sp^2$ represents a $C_{1-6}$ linear, branched, or cyclic alkylene, alkyleneoxy, or alkylene carbonyloxy group, or a direct bond.

Examples of the compound represented by the above formula (2) include compounds represented by the following formula (3):

[Chem. 3]

(3)

wherein $R^5$ and $R^6$ are the same as or different from one another, each representing a hydrogen atom or a methyl group.

The compounds represented by the above formulas (1) to (3) each (i) generate radicals when exposed to light having a wavelength of 350 nm or more; (ii) generate radicals when exposed to light having a wavelength of less than 400 nm; and (iii) have an absorption coefficient of 20 ml/g·cm or less for light having a wavelength of 400 nm or more.

The liquid crystal composition preferably further includes one or more kinds of radical polymerizable monomers each having a ring structure and containing a monofunctional or polyfunctional polymerizable group. Each of the radical polymerizable monomers having a ring structure and containing a monofunctional or polyfunctional group is preferably a compound represented by the following formula (4):

[Chem. 4]

(4)

wherein $R^7$ is a $-R^8-Sp^5-P^5$ group, a hydrogen atom, a halogen atom, a —CN group, a —$NO_2$ group, a —NCO group, a —NCS group, a —OCN group, a —SCN group, a —$SF_5$ group, or a $C_{1-18}$ linear or branched alkyl group;

$P^5$ represents a radical polymerizable group;

$Sp^5$ represents a $C_{1-6}$ linear, branched, or cyclic alkylene or alkyleneoxy group, or a direct bond;

a hydrogen atom of $R^7$ may be replaced by a fluorine atom or a chlorine atom;

a —$CH_2$— group in $R^7$ may be replaced by a —O— group, a S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a—$CH_2CF_2$— group, a —$CF_2CF_2$— group, a —CH=CH— group, a —CF=CF— group, a —C≡C— group, a —CH=CH—COO— group, or a —OCO—CH=CH— group, as long as an oxygen atom and a sulfur atom are mutually apart;

$R^8$ represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_2)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond;

$A^1$ and $A^2$ are the same as or different from one another, each representing a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

a —$CH_2$— group in $A^1$ or $A^2$ may be replaced by a —O— group or a —S— group as long as they are mutually apart;

one or two or more hydrogen atoms in $A^1$ or $A^2$ may each be replaced by a fluorine atom, a chlorine atom, a —CN group, or a $C_{1-6}$ alkyl, alkoxy, alkyl carbonyl, alkoxycarbonyl, or alkylcarbonyloxy group;

Z represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡O— group, a —CH=CH—COO— group, a —OCO—CH=CH— group, or a direct bond; and n is 0, 1, or 2.

Specific examples of the compound represented by the above formula (4) include compounds represented by the following formulas (5-1) to (5-5);

[Chem. 5]

(5-1)
(5-2)
(5-3)
(5-4)
(5-5)

wherein $P^5$s are the same as or different from one another, each representing a radical polymerizable group.

The above $P^5$s are preferably the same or different (meth)acryloyloxy groups.

Several aspects of the present invention also relate to a liquid crystal display device suitably produced using the liquid crystal composition.

That is, another aspect of the present invention is a liquid crystal display device including: a pair of substrates; an alignment film formed on each of the pair of substrates; a liquid crystal layer which is disposed between the pair of substrates and contains a liquid crystal material; and a polymer layer which is formed on the alignment film and controls alignment of liquid crystal molecules, the polymer layer being formed by polymerization of one or more kinds of radical polymerizable monomers added to the liquid crystal layer, at least one kind of the radical polymerizable monomers being a compound generating radicals through a self-cleavage reaction by exposure to light and having at least two radical polymerizable groups.

In the liquid crystal display device of several aspects of the present invention, one of the pair of substrates may be an array substrate, and the other substrate may be a color filter substrate, for example. An array substrate is provided with a plurality of pixel electrodes with which the alignment of liquid crystals is controlled in each pixel. A color filter substrate has sets of color filters of a plurality of colors at positions overlapping the respective pixel electrodes in the array substrate, with which colors to be displayed are controlled in each pixel.

The substrates each are provided with an alignment film for controlling the alignment of liquid crystal molecules. The alignment film in several aspects of the present invention may or may not have undergone an alignment treatment.

The alignment film is provided with a polymer layer for controlling the alignment of liquid crystal molecules. The polymer layer is formed by polymerization of one or more kinds of radical polymerizable monomers added to the liquid crystal layer. Formation of the polymer layer can set the initial tilt of liquid crystal molecules near the alignment films and polymer layers to a certain direction even without an alignment treatment to the alignment films. For example, when a polymer layer is formed by polymerizing monomers with the liquid crystal molecules aligned at a pretilt angle, the polymer layer has a shape that aligns liquid crystal molecules at the pretilt angle, regardless of whether or not the alignment films have undergone the alignment treatment.

The liquid crystal display device of several aspects of the present invention is not especially limited by other components as long as it essentially includes the above-mentioned components.

Preferred embodiments of the liquid crystal display device of several aspects of the present invention include the same embodiments described for the preferred embodiments of the liquid crystal composition of several aspects of the present invention. That is, examples of the preferred embodiments of the liquid crystal display device several aspects of the present invention include:

(a) an embodiment in which the compound generating radicals through a self-cleavage reaction by exposure to light generates radicals when exposed to light having a wavelength of 350 nm or more;

(b) an embodiment in which the compound generating radicals through a self-cleavage reaction by exposure to light generates radicals when exposed to light having a wavelength of less than 400 nm;

(c) an embodiment in which the compound has an absorption coefficient of 20 ml/g·cm or less for light having a wavelength of 400 nm or more;

(d) an embodiment in which the compound generating radicals through a self-cleavage reaction by exposure to light and having at least two radical polymerizable groups is a compound represented by the above formula (1);

(e) an embodiment in which the radical polymerizable group is a (meth)acryloyloxy group, a (meth)acryloylamino group, a vinyl group, or a vinyloxy group;

(f) an embodiment in which $P^1$ and $P^2$ in the compound represented by the above formula (1) are the same or different (meth)acryloyloxy groups;

(g) an embodiment in which the compound generating radicals through a self-cleavage reaction by exposure to light and having at least two radical polymerizable groups is a compound represented by the above formula (2);

(h) an embodiment in which the liquid crystal composition further includes one or more kinds of radical polymerizable monomers each having a ring structure and containing a monofunctional or polyfunctional polymerizable group;

(i) an embodiment in which the radical polymerizable monomers each having a ring structure and containing a monofunctional or polyfunctional polymerizable group include a compound represented by the above formula (4);

(j) an embodiment in which the compound represented by the above formula (4) is any one of compounds represented by the above formulas (5-1) to (5-5); and (k) an embodiment in which $P^5$s in the compounds represented by the above formulas (5-1) to (5-5) are the same or different (meth)acryloyloxy groups.

Several aspects of the present invention also relate to a method for producing a liquid crystal display device suitably produced from the liquid crystal composition.

That is, yet another aspect of the present invention is a method for producing a liquid crystal display device, including the steps of: forming an alignment film on each of a pair of substrates; injecting between the pair of substrates a liquid crystal composition containing a liquid crystal material and one or more kinds of radical polymerizable monomers; and forming on each alignment film a polymer layer for controlling alignment of liquid crystal molecules by irradiating the liquid crystal composition with light to polymerize the radical polymerizable monomers, at least one kind of the radical polymerizable monomers being a compound generating radicals through a self-cleavage reaction by exposure to light and having at least two radical polymerizable groups.

The features of the liquid crystal display device producible by the production method of several aspects of the present invention are the same as the features described for the liquid crystal display device of several aspects of the present invention.

The method for producing a liquid crystal display device according to several aspects of the present invention is not especially limited by other steps as long as it essentially includes the above-mentioned steps.

Preferred embodiments of the method for producing a liquid crystal display device according to several aspects of the present invention include the same embodiments described for the preferred embodiments of the liquid crystal composition or liquid crystal display device of several aspects of the present invention. That is, examples of the preferred embodiments of the method for producing a liquid crystal display device according to several aspects of the present invention include:

(l) an embodiment in which the compound generating radicals through a self-cleavage reaction by exposure to light generates radicals when exposed to light having a wavelength of 350 nm or more;

(m) an embodiment in which the compound generating radicals through a self-cleavage reaction by exposure to light generates radicals when exposed to light having a wavelength of less than 400 nm;

(n) an embodiment in which the compound has an absorption coefficient of 20 ml/g·cm or less for light having a wavelength of 400 nm or more;

(o) an embodiment in which the compound generating radicals through a self-cleavage reaction by exposure to light and having at least two radical polymerizable groups is a compound represented by the above formula (1);

(p) an embodiment in which the radical polymerizable group is a (meth)acryloyloxy group, a (meth)acryloylamino group, a vinyl group, or a vinyloxy group;

(q) an embodiment in which $P^1$ and $P^2$ in the compound represented by the above formula (1) are the same or different (meth)acryloyloxy groups;

(r) an embodiment in which the compound generating radicals through a self-cleavage reaction by exposure to light and having at least two radical polymerizable groups is a compound represented by the above formula (2);

(s) an embodiment in which the liquid crystal composition further includes one or more kinds of radical polymerizable monomers each having a ring structure and containing a monofunctional or polyfunctional polymerizable group;

(t) an embodiment in which the radical polymerizable monomers each having a ring structure and containing a monofunctional or polyfunctional polymerizable group include a compound represented by the above formula (4);

(u) an embodiment in which the compound represented by the above formula (4) is any one of compounds represented by the above formulas (5-1) to (5-5); and (v) an embodiment in which $P^5$s in the compounds represented by the above formulas (5-1) to (5-5) are the same or different (meth)acryloyloxy groups.

Advantageous Effects of Invention

Several aspects of the present invention provide a liquid crystal display device which can greatly reduce the takt time, prevent reduction in the voltage holding ratio (VHR) in the liquid crystal layer, and has favorable display qualities. The liquid crystal display device also has components hardly deteriorated by exposure to light for a long time, and has high reliability.

DESCRIPTION OF EMBODIMENTS

Several aspects of the present invention will be described in more detail below based on embodiments which, however, are not intended to limit the scope of the present invention.
First Embodiment The liquid crystal display device of an aspect of the present invention, a liquid crystal display device produced by the method for producing a liquid crystal display device according to an aspect of the present invention, and a liquid crystal display device produced using the liquid crystal composition of an aspect of the present invention each specifically can achieve excellent display qualities when the concept of an aspect of the present invention is applied to a display device such as a television, a personal computer, a cell phone, a monitor, or an information display.

Figure 1:
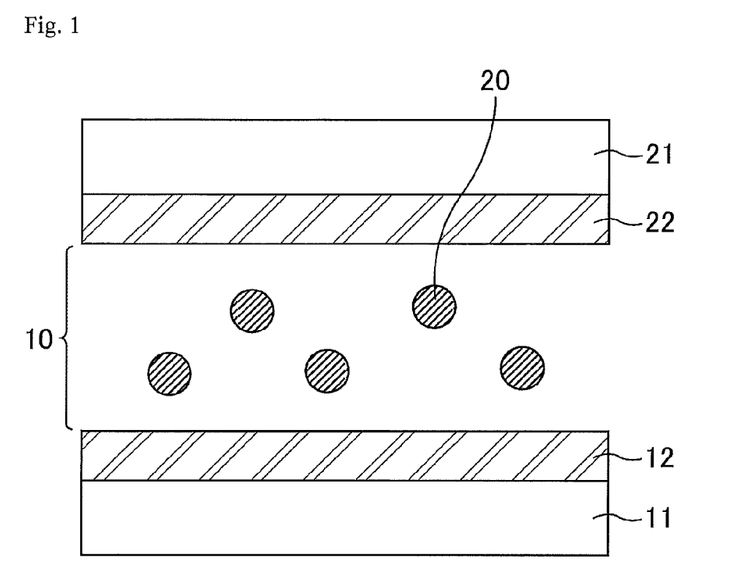
FIG. 1 is a schematic cross-sectional view illustrating the steps in a production example of a liquid crystal cell using the liquid crystal composition of an aspect of the present invention, which illustrates a state before polymerization.
Figure 2:
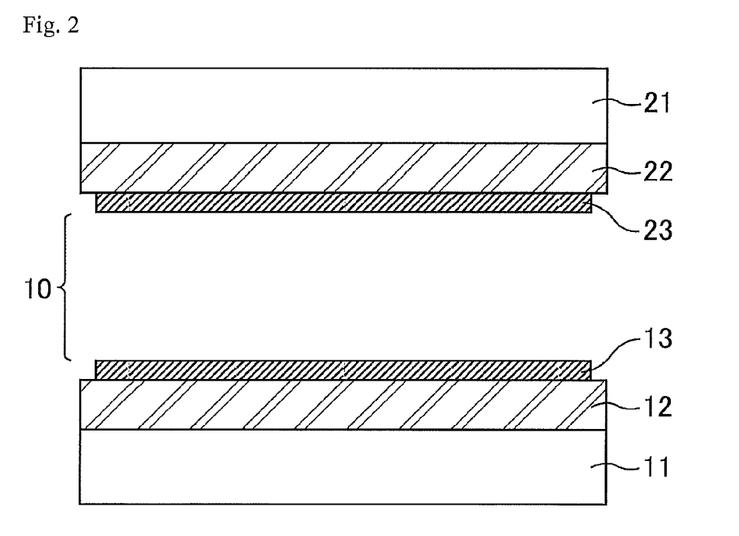
FIG. 2 is a schematic cross-sectional view illustrating the steps in a production example of a liquid crystal cell using the liquid crystal composition of an aspect of the present invention, which illustrates a state after the polymerization.

Hereinafter, an example of the method for producing a liquid crystal display device, which is specifically an example of the use of the liquid crystal composition of an aspect of the present invention, is described. FIG. 1 and FIG. 2 are schematic cross-sectional views illustrating the steps in the production example of a liquid crystal cell using the liquid crystal composition of an aspect of the present invention. FIG. 1 illustrates a state before polymerization, and FIG. 2 illustrates a state after the polymerization. As illustrated in FIG. 1 and FIG. 2, one example of the liquid crystal cell has an array substrate 11, a color filter substrate 21, and a liquid crystal layer 10 disposed between the pair of substrates of the array substrate 11 and the color filter substrate 21. The array substrate 11 includes an insulating transparent substrate made of a material such as glass, and components such as various wirings, pixel electrodes, and thin film transistors (TFTs) formed on the transparent substrate. The color filter substrate 21 includes an insulating transparent substrate made of a material such as glass, and components such as color filters, a black matrix, and a common electrode formed on the transparent substrate.

An alignment film 12 is provided on the array substrate 11, and an alignment film 22 is provided on the color filter substrate 21. The alignment films 12 and 22 each are formed from a material such as a polymer material (polyimide) having a main chain that contains an imide structure. An alignment treatment on the surfaces of the alignment films 12 and 22 allows the liquid crystal molecules to pretilt (initially tilt) vertically or horizontally.

As illustrated in FIG. 1, there are one or more kinds of radical polymerizable monomers 20 in the liquid crystal layer 10 before the PSA polymerization step. The PSA polymerization step by irradiation with light initiates polymerization of the radical polymerizable monomers 20, so that PSA layers (polymer layers) 13 and 23 are respectively formed on the alignment films 12 and 22 as illustrated in FIG. 2.

In the first embodiment, the liquid crystal composition contains a liquid crystal material and one or more kinds of radical polymerizable monomers. At least one kind of the radical polymerizable monomers is a compound generating radicals through a self-cleavage reaction by exposure to light, and has at least two radical polymerizable groups. The liquid crystal material may have positive dielectric constant anisotropy or negative dielectric constant anisotropy.

Therefore, the liquid crystal layer 10 contains the one or more kinds of radical polymerizable monomers 20. Exposure of the liquid crystal layer 10 to light allows the radical polymerizable monomers 20 to generate radicals through a self-cleavage reaction. With the radicals as active species, the radical polymerizable groups of the radical polymerizable monomers 20 sequentially start to undergo chain polymerization and progress the polymerization. Polymers resulting from the polymerization undergo phase separation to be deposited as the PSA layers 13 and 23 respectively on the alignment films 12 and 22 as illustrated in FIG. 2.

The radical polymerizable monomers 20 used in the first embodiment by themselves absorb light and generate radicals through self-cleavage to initiate chain polymerization. Therefore, a polymerization initiator needs not to be added. Also, since the radical polymerizable monomers 20 as a polymerization initiator have at least two functional groups, the polymerization initiator itself functions as a monomer after self-cleavage, which greatly reduces the amount of the polymerization initiator remaining in the liquid crystal layer 10.

For the radical polymerizable monomers used in the first embodiment, compounds represented by the above formula (1), for example, can be used as radical polymerizable monomers generating radicals through self-cleavage by exposure to light. More specifically, the compounds represented by the above formula (2) can be used as the compounds represented by the above formula (1). More specifically, the compounds represented by the above formula (3) can be used as the compounds represented by the above formula (2).

Since the radical polymerizable monomers represented by the above formula (1) generate radicals through self-cleavage, an additional polymerization initiator is not necessary when the monomers are mixed with a liquid crystal material, and irradiation with light alone can initiate the polymerization reaction efficiently. Also, even when easily chargeable impurities which are presumed to be derived from the polymerization initiator are generated, the polymerizable groups of the polymer enable the polymers to form PSA layers and cause phase separation. Hence, image sticking is less likely to occur than in the case of forming the PSA layers using a polymerization initiator. In the first embodiment, other radical polymerizable monomers can be added to the liquid crystal composition.

For the other radical polymerizable monomers, for example, the compounds represented by the above formula (4) can be used. More specifically, the compounds represented by the above formulas (5-1) to (5-5) can be used as the compounds represented by the above formula (4).

Other components of the liquid crystal display device of the first embodiment are described in detail.

In the liquid crystal display device of the first embodiment, the array substrate 11, the liquid crystal layer 10, and the color filter substrate 21 are stacked in the stated order from the rear side to the observation side of the liquid crystal display device. A polarizer is mounted at the rear side of the array substrate 11. A polarizer is also mounted at the observation side of the color filter substrate 21. These polarizers each may be further provided with a retardation plate. These polarizers may be circular polarizers.

The liquid crystal display device according to the first embodiment may be any one of a transmissive type, a reflective type, and a transflective type liquid crystal display devices. In the case of the transmissive type or the transflective type, the liquid crystal display device of the first embodiment further includes a backlight. The backlight is disposed at the rear side of the array substrate 11 so that light passes through the array substrate 11, the liquid crystal layer 10, and the color filter substrate 21 in the stated order. In the case of the reflective type or the transflective type, the array substrate 11 is provided with a reflector for reflecting external light. Moreover, at least in the region where reflected light is used for display, the polarizer of the color filter substrate 21 needs to be a circular polarizer having a λ/4 retardation plate.

The liquid crystal display device of the first embodiment may have a color filter on array structure in which the array substrate 11 includes color filters. Moreover, the liquid crystal display device of the first embodiment may be a monochrome display. In this case, color filters are not necessary.

The liquid crystal layer 10 is filled with a liquid crystal material which has an alignment property in a specific direction under a certain voltage. The alignment of the liquid crystal molecules in the liquid crystal layer 10 is controlled by application of a threshold or higher voltage. The alignment mode for the liquid crystal molecules in the first embodiment is not particularly limited.

A component analysis of monomers for forming the PSA layers present in the PSA layers, the amount of the monomers for forming the PSA layers included in the liquid crystal layer, the ratio of the monomers for forming the PSA layers in the PSA layers, or the like of the liquid crystal display device according to the first embodiment can be determined by disassembling the liquid crystal display device (e.g., cell phone, monitor, liquid crystal TV (television), information display), and then performing a chemical analysis using a method such as nuclear magnetic resonance (NMR), fourier transform infrared spectroscopy (FT-IR), or mass spectrometry (MS).

EXAMPLE 1

The following will discuss Example 1 in which a liquid crystal cell was actually produced in accordance with the first embodiment. First, a pair of substrates was prepared. A polyimide solution for forming a vertical alignment film was applied to the surfaces of the pair of substrates, followed by pre-baking at 80° C. for five minutes and subsequent post-baking at 200° C. for sixty minutes.

Next, a seal material was applied to one of the substrates. A liquid crystal composition containing a liquid crystal material with negative dielectric constant anisotropy and radical polymerizable monomers for forming a PSA layer was dropped onto the substrate. The one substrate was attached to the other substrate.

In Example 1, radical polymerizable monomers represented by the following formulas (6) and (7) were used in combination. A compound represented by the following formula (6) is a bifunctional methacrylate monomer having a biphenyl structure, and a compound represented by the fol- lowing formula (7) is a bifunctional methacrylate monomer having a benzyl ketal structure.

[Chem. 6]

(6)

[Chem. 7]

(7)

For production of the liquid crystal cell of Example 1, a compound represented by the above chemical formula (7) used as a monomer for forming a PSA layer was synthesized. Here, the compound represented by formula (7) was synthesized by the method described below, but any other method can be employed.

SYNTHESIS EXAMPLE 1

Synthesis of 4,4-dihydroxybenzyl

Commercially available 4,4'-dimethoxybenzyl (5.0 g) was dissolved in acetic acid (95 ml), and the temperature of the solution was set to 70° C. Into the solution, a 48% hydrogen bromide (HBr) aqueous solution (31.2 g) was dropped over 10 minutes, and the premixture was stirred for three days. Then, water (150 g) was added to the stirred mixture for crystallization, and the crystallized mixture was filtered. The resulting crystals were washed with water (250 g) and dried, so that the target product (4.0 g) was obtained. The reaction path is represented by the following scheme (8).

[Chem. 8]

(8)

SYNTHESIS EXAMPLE 2

Synthesis of 2,2-dimethoxy-1,2-di-(4-methacryloxy) phenylethan-1-one 4,4-Dihydroxy benzyl (1.6 g) and Ce(TfO)$_3$ (0.58 g) were dissolved in methanol (12.8 g), and the temperature of the solution was set to 50° C. Into the solution was dropped trimethyl orthoformate (4.2 g), and the mixture was stirred for 15 hours. Then, the mixture was cooled to 25° C. or lower, and triethylamine (3.0 g) was added to the mixture at an internal temperature of 30° C. or lower, followed by stirring for five minutes to remove methanol as the solvent. Into the resulting residue was dispersed acetonitrile (14 g). To the dispersion liquid, triethylamine (1.7 g) and dimethylamino pyridine (0.081 g) were further added. Methacrylic anhydride (2.5 g) diluted with acetonitrile (5.0 g) was dropped at 30° C. or lower. After the dropping, the temperature of the mixture was set to 25° C., and the mixture was stirred for two hours. Then, a 3% NaHCO$_3$ aqueous solution (64 g) was added, and the mixture was stirred for five minutes. The mixture was extracted with toluene (32 g). The extract was washed with water (10 g) three times and with saturated brine (10 g) once. Methoquinone (2.50 mg) was added to the extract and then the solvent was distilled from the extract. The obtained residue was purified by column chromatography (ethyl acetate: hexane=1:5) and dried. Thereby, 2,2-dimethoxy-1,2-di-(4-methacryloxy)phenylethan-1-one (1.65 g) which was a white solid was obtained. The reaction path is represented by the following scheme (9).

[Chem. 9]

(9)

The analysis results of the obtained compound are as shown below. The obtained compound was determined to be 2,2-dimethoxy-1,2-di-(4-methacryloxy)phenylethan-1-one by $^1$H-NMR.

$^1$H-NMR (CDCl$_3$, ppm): δ=2.03 (s, 6H, methyl group), 3.23 (s, 6H, methyl group), 5.74 (s, 1H, vinyl group), 5.76 (s, 1H, vinyl group), 6.32 (s, 2H, vinyl group), 7.09 (d, 2H, benzene ring), 7.14 (d, 2H, benzene ring), 7.63 (d, 2H, benzene ring), 8.13 (d, 2H, benzene ring)

The samples prepared in Example 1 are the following samples A and B. The sample A was a liquid crystal composition containing a bifunctional biphenyl methacrylate monomer (0.3 wt %) represented by the above formula (6) and a bifunctional benzyl ketal methacrylate monomer (0.05 wt %) represented by the above formula (7). The sample B was a liquid crystal composition containing a bifunctional biphenyl methacrylate monomer (0.3 wt %) represented by the above formula (6).

Next, the liquid crystal layer disposed between a pair of substrates was exposed to black light (ultraviolet light having a peak wavelength in the range of 300 to 370 nm) under no voltage application to initiate polymerization reaction. Thereby, a liquid crystal cell in which a PSA layer was formed on a vertical alignment film was produced using each of the compositions. The time for exposure to ultraviolet light was 1 to 5 minutes. The ultraviolet light source used was an FHF-32BLB produced by Toshiba Lighting and Technology Corporation. The FHF-32BLB is an ultraviolet light source that emits light having a wavelength of 310 nm with low intensity and light having a wavelength of not less than 330 nm with high intensity.

Each of the produced liquid crystal cells was measured for the voltage holding ratio (VHR). The VHR was determined by measuring the charge retention after a lapse of 16.61 ms from application of a pulse voltage of 1 V. The initial introduction amount ratio of the bifunctional biphenyl methacrylate monomer remained in the liquid crystal layer after the VHR measurement was determined by gas chromatography. Table 1 shows the measurement results of VHR (%) and the residual monomer ratio of each sample.

TABLE 1

| Sample | Monomer weight ratio | Exposure time (min) | VHR (%) | Residual monomer ratio (%) |
|---|---|---|---|---|
| A | Formula (6)-0.3 wt % + formula (7)-0.05 wt % | 1 | 99.4 | 18 |
| A | Formula (6)-0.3 wt % + formula (7)-0.05 wt % | 5 | 99.0 | 7 |
| B | Formula (6)-0.3 wt % | 1 | 99.5 | 50 or higher |
| B | Formula (6)-0.3 wt % | 5 | 99.0 | 50 or higher |

With the composition (sample A) containing the bifunctional biphenyl methacrylate monomer (0.3 wt %) represented by the above formula (6) and the bifunctional biphenyl benzyl ketal methacrylate monomer (0.05 wt %) represented by the above formula (7), the residual ratio of the bifunctional biphenyl methacrylate monomer reached 10% or lower only by five minutes of irradiation with black light. Also, the VHR was maintained at 99.0% or higher, and the reliability was achieved.

Meanwhile, with the composition (sample B) containing the bifunctional biphenyl methacrylate monomer (0.3 wt %) represented by the above formula (6) only, five minutes of irradiation with black light alone achieved a VHR of a level of 99% but caused the residual ratio of the monomer to be 50% or higher, which shows that formation of the PSA layers was insufficient.

EXAMPLE 2

The following will discuss Example 2 in which a liquid crystal cell of the liquid crystal display device of the first embodiment was actually produced. The samples for the liquid crystal cell used in Example 2 were produced in the same manner as in Example 1.

In Example 2, radical polymerizable monomers represented by the following formula (10) and the above formula (7) were used in combination. A compound represented by the following formula (10) is a bifunctional phenanthrene methacrylate monomer, and a compound represented by the above formula (7) is the same bifunctional benzyl ketal methacrylate monomer as in Example 1.

[Chem. 10]

(10)

The samples prepared in Example 2 are the following samples C to F. The sample C was a liquid crystal composition containing a bifunctional phenanthrene methacrylate monomer (0.3 wt %) represented by the above formula (10) and a bifunctional benzyl ketal methacrylate monomer (0.05 wt %) represented by the above formula (7). The sample D was a liquid crystal composition containing a bifunctional phenanthrene methacrylate monomer (0.6 wt %) represented by the above formula (10) and a bifunctional benzyl ketal methacrylate monomer (0.05 wt %) represented by the above formula (7). The sample E was a liquid crystal composition containing a bifunctional phenanthrene methacrylate monomer (0.3 wt %) represented by the above formula (10). The sample F was a liquid crystal composition containing a bifunctional phenanthrene methacrylate monomer (0.6 wt %) represented by the above formula (10).

Next, the liquid crystal layer disposed between a pair of substrates was exposed to black light (ultraviolet light having a peak wavelength in the range of 300 to 370 nm) to initiate polymerization reaction. Thereby, a liquid crystal cell in which a PSA layer was formed on a vertical alignment film was produced using each of the compositions. The time for exposure to ultraviolet light was 1 to 5 minutes. The ultraviolet light source used was an FHF-32BLB produced by Toshiba Lighting and Technology Corporation.

Each of the produced liquid crystal cells was measured for the VHR and the residual monomer ratio. The measurement results are shown in the following table.

TABLE 2

| Sample | Monomer weight ratio | Exposure time (min) | VHR (%) | Residual monomer ratio (%) |
|---|---|---|---|---|
| C | Formula (10)-0.3 wt % + formula (7)-0.05 wt % | 1 | 99.4 | 13 |
| C | Formula (10)-0.3 wt % + formula (7)-0.05 wt % | 5 | 99.0 | 5 |
| D | Formula (10)-0.6 wt % + formula (7)-0.05 wt % | 1 | 99.4 | 13 |
| D | Formula (10)-0.6 wt % + formula (7)-0.05 wt % | 5 | 99.0 | 5 |
| E | Formula (10)-0.3 wt % | 1 | 99.5 | 30 or higher |
| E | Formula (10)-0.3 wt % | 5 | 99.0 | 8 |
| F | Formula (10)-0.6 wt % | 1 | 99.5 | 30 or higher |
| F | Formula (10)-0.6 wt % | 5 | 99.3 | 8 |

With the composition (sample C) containing the bifunctional phenanthrene methacrylate monomer (0.3 wt %) represented by the above formula (10) and the bifunctional benzyl ketal methacrylate monomer (0.05 wt %) represented by the above formula (7), the residual ratio of the bifunctional phenanthrene methacrylate monomer reached 5% only by five minutes of irradiation with black light. Also, the VHR was maintained at 99.0% or higher, and the reliability was achieved.

With the composition (sample D) containing the bifunctional phenanthrene methacrylate monomer (0.6 wt %) represented by the above formula (10) and the bifunctional benzyl ketal methacrylate monomer (0.05 wt %) represented by the above formula (7), the residual ratio of the bifunctional phenanthrene methacrylate monomer reached 5% by five minutes of irradiation with black light. Also, the VHR was maintained at 99.0% or higher, and the reliability was achieved.

Meanwhile, with the composition (sample E) containing the bifunctional phenanthrene methacrylate monomer (0.3 wt %) represented by the above formula (10) only, five minutes of irradiation with black light alone achieved a monomer residual ratio of 8%, which is higher than the monomer residual ratio in the case that the composition contains a bifunctional benzyl ketal methacrylate monomer.

Also with the composition (sample F) containing the bifunctional phenanthrene methacrylate monomer (0.6 wt %) represented by the above formula (10) only, similarly to the sample E, five minutes of irradiation with black light alone achieved a monomer residual ratio of 8%, which is higher than the monomer residual ratio in the case that the composition contains a bifunctional benzyl ketal methacrylate monomer.

The present application claims priority to Patent Application No. 2011-051839 filed in Japan on Mar. 9, 2011 under the Paris Convention and provisions of national law in a designated State, the entire contents of which are hereby incorporated by reference.

REFERENCE SIGNS LIST

10: Liquid crystal layer
11: Array substrate
12, 22: Alignment film
13, 23: PSA layer (polymer layer)
20: Radical polymerizable monomer
21: Color filter substrate

The invention claimed is:
1. A liquid crystal composition comprising
a liquid crystal material and
one or more kinds of radical polymerizable monomers,
at least one kind of the radical polymerizable monomers being a compound generating radicals through a self-cleavage reaction by exposure to light and having at least two radical polymerizable groups.
2. The liquid crystal composition according to claim 1, wherein the compound generating radicals through a self-cleavage reaction by exposure to light generates radicals when exposed to light having a wavelength of 350 nm or more.
3. The liquid crystal composition according to claim 1, wherein the compound generating radicals through a self-cleavage reaction by exposure to light generates radicals when exposed to light having a wavelength of less than 400 nm.
4. The liquid crystal composition according to claim 1, wherein the compound has an absorption coefficient of 20 ml/g·cm or less for light having a wavelength of 400 nm or more.
5. The liquid crystal composition according to claim 1, wherein the compound generating radicals through a self-cleavage reaction by exposure to light and having at least two radical polymerizable groups is a compound represented by the following formula (1):

[Chem. 1]

(1)

wherein
$R^1$ represents a $C_{1-4}$ linear or branched alkyl or alkenyl group, or $Sp^3$-$P^3$;
$R^2$ represents a $C_{1-4}$ linear or branched alkyl or alkenyl group, or $Sp^4$-$P^4$;
$P^1$, $P^2$, $P^3$, and $P^4$ represent the same or different radical polymerizable groups, and the total number of the groups is 2 or more;
$Sp^1$ represents a $C_{1-6}$ linear, branched, or cyclic alkylene, alkyleneoxy, or alkylene carbonyloxy group, or a direct bond, and when $m^1$ is 2 or more, $Sp^1$s are the same as or different from one another;
$Sp^2$ represents a $C_{1-6}$ linear, branched, or cyclic alkylene, alkyleneoxy, or alkylene carbonyloxy group, or a direct bond, and when $m^2$ is 2 or more, $Sp^2$s are the same as or different from one another;
$Sp^3$ represents a $C_{1-6}$ linear, branched, or cyclic alkylene, alkyleneoxy, or alkylene carbonyloxy group;
$Sp^4$ represents a $C_{1-6}$ linear, branched, or cyclic alkylene, alkyleneoxy, or alkylene carbonyloxy group;
$L^1$ represents a —F group, a —OH group, or a $C_{1-12}$ linear or branched alkyl, alkenyl, or aralkyl group, and when $n^1$ is 2 or more, $L^1$s are the same as or different from one another;
if two $L^1$s are bonded to respective two adjacent carbon atoms on the aromatic ring, the two $L^1$s may be bonded to each other to form a ring structure, and are the same as or different from one another, each representing a $C_{1-12}$ linear or branched alkylene or alkenylene group;
$L^2$ represents a —F group, a —OH group, or a $C_{1-12}$ linear or branched alkyl, alkenyl, or aralkyl group, and when $n^2$ is 2 or more, $L^2$s are the same as or different from one another;
if two $L^2$s are bonded to respective two adjacent carbon atoms on the aromatic ring, the two $L^2$s may be bonded to each other to form a ring structure, and are the same as or different from one another, each representing a $C_{1-12}$ linear or branched alkylene or alkenylene group;
one or more hydrogen atoms on the alkyl, alkenyl, alkylene, alkenylene, or aralkyl group for $L^1$ or $L^2$ may be replaced by —F groups or —OH groups;
a —$CH_2$— group on the alkyl, alkenyl, alkylene, alkenylene, or aralkyl group for $L^1$ or $L^2$ may be replaced by a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, a $Sp^1$-$P^1$ group, or a $Sp^2$-$P^2$ group as long as an oxygen atom, a sulfur atom, and a nitrogen atom are mutually apart;

$m^1$ is an integer of 1 to 3;
$m^2$ is an integer of 0 to 3;
$n^1$ is an integer of 0 to 4;
$n^2$ is an integer of 0 to 4;
$m^1$ and $n^1$ add up to an integer of 1 to 5;
$m^2$ and $n^2$ add up to an integer of 0 to 5; and
$m^1$ and $m^2$ add up to an integer of 1 to 6.

6. The liquid crystal composition according to claim 5,
wherein the radical polymerizable group is a (meth)acryloyloxy group, a (meth)acryloylamino group, a vinyl group, or a vinyloxy group.

7. The liquid crystal composition according to claim 5, wherein $P^1$ and $P^2$ are the same or different (meth)acryloyloxy groups.

8. The liquid crystal composition according to claim 1,
wherein the compound generating radicals through a self-cleavage reaction by exposure to light and having at least two radical polymerizable groups is a compound represented by the following formula (2):

[Chem. 2]

(2)

wherein
$R^3$ represents a $C_{1-4}$ linear or branched alkyl or alkenyl group;
$R^4$ represents a $C_{1-4}$ linear or branched alkyl or alkenyl group;
$P^1$ and $P^2$ represent the same or different radical polymerizable groups;
$Sp^1$ represents a $C_{1-6}$ linear, branched, or cyclic alkylene, alkyleneoxy, or alkylene carbonyloxy group, or a direct bond; and
$Sp^2$ represents a $C_{1-6}$ linear, branched, or cyclic alkylene, alkyleneoxy, or alkylene carbonyloxy group, or a direct bond.

9. The liquid crystal composition according to claim 1, further comprising
one or more kinds of radical polymerizable monomers each having a ring structure and containing a monofunctional or polyfunctional polymerizable group.

10. The liquid crystal composition according to claim 9,
wherein the radical polymerizable monomers each having a ring structure and containing a monofunctional or polyfunctional polymerizable group include a compound represented by the following formula (4):

[Chem. 3]

(4)

wherein
$R^7$ is a —$R^8$-$Sp^5$-$P^5$ group, a hydrogen atom, a halogen atom, —CN group, a —$NO_2$ group, a —NCO group, a —NCS group, a —OCN group, a —SCN group, a —$SF_5$ group, or a $C_{1-18}$ linear or branched alkyl group;
$P^5$ represents a radical polymerizable group;
$Sp^5$ represents a $C_{1-6}$ linear, branched, or cyclic alkylene or alkyleneoxy group, or a direct bond;
a hydrogen atom of $R^7$ may be replaced by a fluorine atom or a chlorine atom;
a —$CH_2$—group in $R^7$ may be replaced by a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, as long as an oxygen atom and a sulfur atom are mutually apart;

$R^8$ represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond;

$A^1$ and $A^2$ are the same as or different from one another, each representing a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

a —$CH_2$— group in $A^1$ or $A^2$ may be replaced by a —O— group or a —S— group as long as they are mutually apart;

one or two or more hydrogen atoms in $A^1$ or $A^2$ may each be replaced by a fluorine atom, a chlorine atom, a —CN group, or a $C_{1-6}$ alkyl, alkoxy, alkyl carbonyl, alkoxycarbonyl, or alkylcarbonyloxy group;

Z represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n is 0, 1, or 2.

11. The liquid crystal composition according to claim 10, wherein the compound is any one of compounds represented by the following formulas (5-1) to (5-5):

[Chem. 4]

(5-1)

(5-2)

(5-3)

(5-4)

(5-5)

wherein P$^5$s are the same as or different from one another, each representing a radical polymerizable group.

12. The liquid crystal composition according to claim 11, wherein P$^5$s are the same or different (meth)acryloyloxy groups.

13. A liquid crystal display device comprising:
a pair of substrates;
an alignment film formed on each of the pair of substrates;
a liquid crystal layer which is disposed between the pair of substrates and contains a liquid crystal material; and
a polymer layer which is formed on the alignment film and controls alignment of liquid crystal molecules,
the polymer layer being formed by polymerization of one or more kinds of radical polymerizable monomers added to the liquid crystal layer,
at least one kind of the radical polymerizable monomers being a compound generating radicals through a self-cleavage reaction by exposure to light and having at least two radical polymerizable groups.

14. The liquid crystal display device according to claim 13, wherein the compound generating radicals through a self-cleavage reaction by exposure to light generates radicals when exposed to light having a wavelength of 350 nm or more.

15. The liquid crystal display device according to claim 13, wherein the compound generating radicals through a self-cleavage reaction by exposure to light generates radicals when exposed to light having a wavelength of less than 400 nm.

16. The liquid crystal display device according to claim 13, wherein the compound has an absorption coefficient of 20 ml/g·cm or less for light having a wavelength of 400 nm or more.

17. The liquid crystal display device according to claim 13, wherein the compound generating radicals through a self-cleavage reaction by exposure to light and having at least two radical polymerizable groups is a compound represented by the following formula (1):

[Chem. 5]

(1)

wherein
R$^1$ represents a C$_{1-4}$ linear or branched alkyl or alkenyl group, or Sp$^3$-P$^3$;

R$^2$ represents a C$_{1-4}$ linear or branched alkyl or alkenyl group, or Sp$^4$-P$^4$;

P$^1$, P$^2$, P$^3$, and P$^4$ represent the same or different radical polymerizable groups, and the total number of the groups is 2 or more;

Sp$^1$ represents a C$_{1-6}$ linear, branched, or cyclic alkylene, alkyleneoxy, or alkylene carbonyloxy group, or a direct bond, and when m$^1$ is 2 or more, Sp$^1$s are the same as or different from one another;

Sp$^2$ represents a C$_{1-6}$ linear, branched, or cyclic alkylene, alkyleneoxy, or alkylene carbonyloxy group, or a direct bond, and when m$^2$ is 2 or more, Sp$^2$s are the same as or different from one another;

Sp$^3$ represents a C$_{1-6}$ linear, branched, or cyclic alkylene, alkyleneoxy, or alkylene carbonyloxy group;

Sp$^4$ represents a C$_{1-6}$ linear, branched, or cyclic alkylene, alkyleneoxy, or alkylene carbonyloxy group;

L$^1$ represents a —F group, a —OH group, or a C$_{1-12}$ linear or branched alkyl, alkenyl, or aralkyl group, and when n$^1$ is 2 or more, L$^1$s are the same as or different from one another;

if two L$^1$s are bonded to respective two adjacent carbon atoms on the aromatic ring, the two L$^1$s may be bonded to each other to form a ring structure, and are the same as or different from one another, each representing a C$_{1-12}$ linear or branched alkylene or alkenylene group;

L$^2$ represents a —F group, a —OH group, or a C$_{1-12}$ linear or branched alkyl, alkenyl, or aralkyl group, and when n$^2$ is 2 or more, L$^2$s are the same as or different from one another;

if two L$^2$s are bonded to respective two adjacent carbon atoms on the aromatic ring, the two L$^2$s may be bonded to each other to form a ring structure, and are the same as or different from one another, each representing a C$_{1-12}$ linear or branched alkylene or alkenylene group;

one or more hydrogen atoms on the alkyl, alkenyl, alkylene, alkenylene, or aralkyl group for L$^1$ or L$^2$ may be replaced by —F groups or —OH groups;

a —CH$_2$— group on the alkyl, alkenyl, alkylene, alkenylene, or aralkyl group for L$^1$ or L$^2$ may be replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, a Sp$^1$-P$^1$ group, or a Sp$^2$-P$^2$ group as long as an oxygen atom, a sulfur atom, and a nitrogen atom are mutually apart;

m$^1$ is an integer of 1 to 3;
m$^2$ is an integer of 0 to 3;
n$^1$ is an integer of 0 to 4;
n$^2$ is an integer of 0 to 4;
m$^1$ and n$^1$ add up to an integer of 1 to 5;
m$^2$ and n$^2$ add up to an integer of 0 to 5; and
m$^1$ and m$^2$ add up to an integer of 1 to 6.

18. The liquid crystal display device according to claim 17, wherein the radical polymerizable group is a (meth)acryloyloxy group, a (meth)acryloylamino group, a vinyl group, or a vinyloxy group.

19. The liquid crystal display device according to claim 13, wherein the liquid crystal composition further comprises one or more kinds of radical polymerizable monomers each having a ring structure and containing a monofunctional or polyfunctional polymerizable group.

20. The liquid crystal display device according to claim 19, wherein the radical polymerizable monomers each having a ring structure and containing a monofunctional or polyfunctional polymerizable group include a compound represented by the following formula (4):

[Chem. 7]

$$P^5\text{-Sp}^5\text{-R}^8\text{-A}^1\text{-(Z-A}^2)_n\text{-R}^7 \quad (4)$$

wherein
R$^7$ is a —R$^8$-Sp$^5$-P$^5$ group, a hydrogen atom, a halogen atom, —CN group, a —NO$_2$ group, a —NCO group, a —NCS group, a —OCN group, a —SCN group, a —SF$_5$ group, or a C$_{1-18}$ linear or branched alkyl group;
P$^5$ represents a radical polymerizable group;
Sp$^5$ represents a C$_{1-6}$ linear, branched, or cyclic alkylene or alkyleneoxy group, or a direct bond;
a hydrogen atom of R$^7$ may be replaced by a fluorine atom or a chlorine atom;
a —CH$_2$—group in R$^7$ may be replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, as long as an oxygen atom and a sulfur atom are mutually apart;

R$^8$ represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond;

A$^1$ and A$^2$ are the same as or different from one another, each representing a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

a —CH$_2$— group in A$^1$ or A$^2$ may be replaced by a —O— group or a —S— group as long as they are mutually apart;

one or two or more hydrogen atoms in A$^1$ or A$^2$ may each be replaced by a fluorine atom, a chlorine atom, a —CN group, or a C$_{1-6}$ alkyl, alkoxy, alkyl carbonyl, alkoxycarbonyl, or alkylcarbonyloxy group;

Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n is 0, 1, or 2.

* * * * *